US006934691B1

(12) United States Patent
Simpson et al.

(10) Patent No.: US 6,934,691 B1
(45) Date of Patent: Aug. 23, 2005

(54) SYSTEM AND METHOD FOR MANAGING MAIL/BILLS THROUGH A CENTRAL LOCATION

(75) Inventors: John S. Simpson, Redwood City, CA (US); Murali Chirala, Morgan Hill, CA (US)

(73) Assignee: Metavante Corporation, Brown Deer, WI (US)

( * ) Notice: Subject to any disclaimer, the term of this patent is extended or adjusted under 35 U.S.C. 154(b) by 537 days.

(21) Appl. No.: 09/247,134

(22) Filed: Feb. 9, 1999

(51) Int. Cl.[7] .......................... G06F 17/60; G06F 15/40; G06K 9/00
(52) U.S. Cl. ........................... 705/34; 705/40; 382/101; 382/209; 382/217; 382/218; 382/310
(58) Field of Search ............................. 705/27, 40, 34

(56) References Cited

U.S. PATENT DOCUMENTS

| | | | | |
|---|---|---|---|---|
| 5,648,916 A | * | 7/1997 | Manduley | 364/514 |
| 5,649,117 A | | 7/1997 | Landry | 395/240 |
| 5,655,089 A | | 8/1997 | Bucci | 395/240 |
| 5,699,528 A | | 12/1997 | Hogan | 395/240 |
| 5,832,460 A | * | 11/1998 | Bendnar et al. | 705/27 |
| 5,884,288 A | * | 3/1999 | Chang et al. | 705/40 |
| 5,956,700 A | | 9/1999 | Landry | 705/40 |
| 5,963,925 A | * | 10/1999 | Kolling et al. | 705/40 |
| 5,978,780 A | * | 11/1999 | Watson | 705/40 |
| 6,094,505 A | * | 7/2000 | Lech et al. | 382/180 |
| 6,097,834 A | * | 8/2000 | Krouse et al. | 382/137 |

FOREIGN PATENT DOCUMENTS

| | | | | |
|---|---|---|---|---|
| WO | WO 98/26364 | * | 6/1998 | G06F/17/60 |
| WO | WO 99/05628 | * | 2/1999 | G06F/17/60 |

OTHER PUBLICATIONS

First Union Promotes Electronic Commerce Initiatives; Retail Delivery News, Potomac: Dec. 23, 1998, vol. 3, Iss. 25; p. 1.*

Storm Technology, Inc. Partners with Xerox ScanSoft and Design Intelligence to Provide its Customers with the First "Document Software Suite" For Easily Managing and Creating Professional Document Software Suite' for Easily Managing and Creating Profession.*

* cited by examiner

Primary Examiner—Yehdega Retta
(74) Attorney, Agent, or Firm—Reinhart Boerner Van Deuren S.C.

(57) ABSTRACT

The present invention is a system and method for managing mail/bills from a central online location. Mail/bills are sent/forwarded to the central online location via electronically or traditional mailing service. Once the mail are received, they are sorted, and either discarded or stored in a database for further processing. The central online location further consolidates both electronic and paper formatted bills into an easily manageable and accessible manner. The subscriber can view the bills online and take appropriate action. Further, the subscriber saves time and money in not having to review unimportant mail because they are discarded in accordance with the subscriber's instructions.

25 Claims, 10 Drawing Sheets

CUSTOMER STATEMENT
Statement Date: OCT 08 1997
Customer Name: Jane Smith
Service Address: 122 Main Street Account Number: 4110149
Service Dates: SEP 08 97 to Oct 08 97
Service Days: 30
Next Scheduled Read Date: NOV 06 1997

230

| PREVIOUS BALANCE | PAYMENTS | CREDITS | BALANCE BEFORE CURRENT CHARGES | CURRENT CHARGES | BALANCE DUE BEFORE | BALANCE DUE |
|---|---|---|---|---|---|---|
| 163.66 | 163.66CR | 0.00 | 0.00 | 30.22 | OCT 29 1997 | $30.22 |

Meter Reading - Meter 22453
Current Reading        21876
Previous Reading       21565
KWH Used                 311

Energy Usage
KWH This Month           311
Service Days              30
KWH/Day                   10

\*\*Amt Includes the following charges:
Customer Charge:   $5.65 per Month
Non-Fuel Energy Charge:
  First 750 KWH   $0.04897 per KWH
  Over 750 KWH    $0.05897 per KWH
Fuel Charge:      $0.01646 per KWH Account Activity Previous Statement Balance                          163.66
Payment Received - THANK YOU                     163.66 CR Billing for Electric Use on Rate : RS-1 RESIDENTIAL SERVICE Electric Service Amount            26.00 \*\*
Gross Receipts Tax Increase         0.27
Franchise Charge                    1.46
Utility Tax                         2.49
  Current Electric Charges                          30.22

TOTAL NOW DUE:                                     $30.22
Messages
-A late payment charge of 1.5% will apply if not paid by Oct 29.
-The FPSC has approved new fuel and non-fuel energy charges
 effective September 26. A typical 1,000 kwh residential bill
 will be $74.33, a decrease of $3.70.
-Transactions involving connects, disconnects, name changes and
 payment extensions may require positive identification.

Customer Service: 800-556-1122

FIG. 6B

Quick Summary

Level 2 Summary

SYSTEM AND METHOD FOR MANAGING MAIL/BILLS THROUGH A CENTRAL LOCATION

FIELD OF THE INVENTION

The present invention relates to a system and method for managing mail through a central online location, and more particularly, to a system and method that allows subscribers to manage personal and/or business bills from the central online location.

BACKGROUND OF THE INVENTION

Mail service is a universally known and accepted practice throughout the world. Without question, communicating with mail will continue to be a necessary and critical part of everyone's life.

Before the advent of the electronic data exchange, Internet, and the World Wide Web (WWW), mail were typically delivered by transporting them to its destination. Although physically delivering mail is still very popular and widely used, many are now using the Internet and the WWW as an alternative to sending and receiving mail. Some advantages of using the Internet and the WWW are the reduced cost and the instantaneous access to mail. Partly because of these reasons, the use of electronic mail (email) has become an everyday practice in homes, businesses, and the like, and is generally known and accepted in the public.

On the average, a person receives hundreds, or perhaps thousands of bills every year, while a particular business can easily receive over a million bills in that same year. Along with the bills, a person/business may receive other types of mail such as personal letters, magazines, advertisements, accounts payable, invitations, etc.

As businesses grow and people become busier, managing mail, particularly bills can be a time consuming and burdensome process. For example, when a particular mail is received, one must open it and spend the necessary time reading it to determine its level of importance. Many other types of mail, such as advertisements or the like, are generally of very little importance, but one does not necessarily know this until the mail are opened and reviewed. After determining that the particular mail is a bill and is of high importance, the bill is usually set aside and not acted upon until a later date. When this later date arrives, the bill may not have been timely acted upon by the person depending on the memory and/or time constraints of the person. If the bill is not timely acted upon, a merchant will generally access a late fee and/or additional charges as a result of this delay. Even if the person can pay the bill on time, the person must spend the necessary time replying to it. For instance, the person must write out a check, balance the corresponding bank account, prepare the reply envelope, and send off the check along with the corresponding bill statement. When considering the large number of bills a person must reply to in a year, this traditional method is very time consuming and burdensome. Furthermore, the traditional method described above is also inefficient and can be costly.

The systems and methods currently available for managing mail/bills are an improvement in this field. For example, there are many businesses that are scanning paper mail into electronic format so that an employer/employee may access the mail from a remote location. This conventional method, however, do not provide a method for managing bills. Further, most systems and methods currently available that manage bills are believed to manage only electronic bills.

Thus, there is a need for a system and method that can manage both electronic and paper formatted bills in a consistent manner. Accordingly, a more efficient and cost effective system and method for managing mail, in particular, bills is needed.

SUMMARY OF THE INVENTION

It is an object of the present invention to provide a system and method that can manage mail/bills from a central location.

It is another object of the present invention to provide a system and method that can consolidate paper and electronic mail/bills at a central location.

It is yet another object of the present invention to provide a system and method that can process mail/bills from a central location.

The present invention manages mail by sorting them into different categories. The sorted mail are then forwarded for further processing. For example, if a particular mail is not a bill and was sent bulk rate, then the mail is shredded. If, on the other hand, the particular mail is not a bill and was sent first class, then the mail is forwarded to the subscriber's address. Next, if the particular mail is determined to be a bill, the envelope is opened and the contents contained therein are separated and reviewed. Depending on the contents enclosed, the information contained therein may be stored and the contents filed and/or shredded. Finally, for those mail that are can not be easily ascertained whether they are bills or not, they are further reviewed at different levels.

BRIEF DESCRIPTION OF THE DRAWINGS

These and other objects and advantages of the present invention will become apparent and more readily appreciated from the following detailed description of the presently preferred exemplary embodiment of the invention taken in conjunction with the accompanying drawings, of which:

FIG. 6B illustrates a bill transmitted electronically to the BMS in accordance with the preferred embodiment of the present invention;

DETAILED DESCRIPTION OF THE PREFERRED EMBODIMENTS

The preferred embodiments of the present invention will now be described with reference to FIGS. 1–10. The present invention allows a subscriber to manage mail, and particularly, to consolidate, access, and/or process personal and/or business bills from a central online location. An online Bill Managing Service (BMS) can be accessed with any known electronic device capable of receiving and transmitting data (computers, palm pilots, webtv, or the like) via a public Internet and/or a private network or virtual private network (e.g. leased lines, X.25, Frame Relay, ISDN, or ATM). The personal and/or business bills in their original form may be in paper or electronic format.

Although the principles of the invention can be applied to services other than for managing mail and bills, the preferred embodiment of a billing service will be described in detail. Moreover, one skilled in the art will appreciate that various substitutions and modifications can be made to the examples described herein while remaining within the spirit and scope of the present invention.

Figure 1:
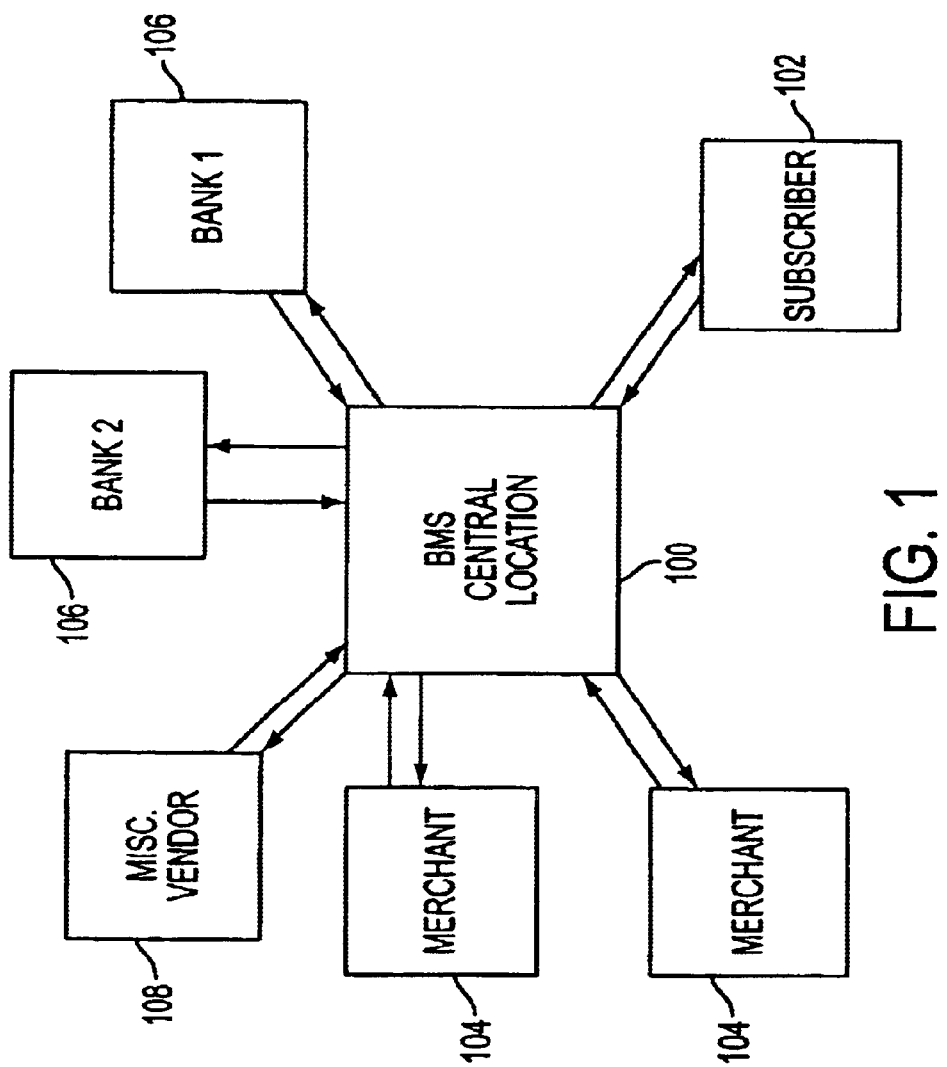
FIG. 1 illustrates a simplified block diagram of a centrally located system used for managing mail in accordance with the preferred embodiment of the present invention.

FIG. 1 illustrates an overview of a centrally located system used for managing mail in accordance with the preferred embodiment of the present invention. As will be described more fully hereinafter, a centrally located system 100, or Bill Management Service (BMS), manages mail/bills by communicating with a subscriber 102, merchants 104, banks 106, and miscellaneous vendor 108. Although FIG. 1 illustrates only one subscriber 102, two merchants 104, two banks 106, and one vendor 108, it is understood that the preferred embodiment of the present invention can utilize any number of subscribers, merchants, banks, vendors, or the like, and that other institutions may be substituted for the ones described above. Mail/bills are sent/forwarded to the BMS 100 via electronically or traditional mailing service from various sources such as subscriber 102, merchant 104, vendor 108, bank 106, etc. Once the mail are received, they are sorted and processed at the BMS 100 as described in more detail later herein. The BMS 100 further consolidates both electronic and paper formatted bills into an easily manageable and accessible manner.

The subscriber 102 can view the bills online and request that the BMS 100 make a payment to the merchant 104. Per the subscriber's 102 request, the BMS 100 will communicate with the subscriber's bank 106 to take appropriate steps to ensure that the payment is made and that the subscriber's account is debited. Further, when the BMS 100 receives mail, the BMS 100 will review the mail and determine the level of importance. If the mail are of marginal importance, the BMS 100 may disregard the mail and delete and/or shred them in accordance with the subscriber's instructions. This will save the subscriber 102 time and money in not having to review such unimportant mail.

The process of subscribing to the online BMS 100 will now be described. As in many online services, the subscriber 102 first needs to subscribe to this service. The subscriber 102 can subscribe to the BMS 100 directly by visiting the new subscriber URL or using traditional methods such as telephoning and/or mailing in a BMS's new subscriber form (not shown). Preferably, the subscriber 102 will provide the name, home/business address, phone numbers, email address, desired userid, desired password corresponding to the desired userid, and the desired level of service. It should be noted that although the information stated above are generally sufficient for initial sign up with the BMS 100, other information may be requested from time to time depending on the level of service requested by the subscriber or when there is a change of the subscriber's given information.

Further, when the subscriber 102 desires to subscribe online, as will be in most of the cases, the subscriber 102 will immediately receive information on whether the desired userid and/or desired password are available. If either the desired userid or the password is unavailable, the subscriber 102 will be prompted to choose alternative userids or passwords to complete the subscription requirements. If the desired userid and password are available, the subscriber 102 will now be able to access the online BMS system using the new userid and password.

Upon fulfilling the subscription requirements, the subscriber 102 will receive an email from the BMS 100 with a BMS address that the subscriber can use for traditional paper bills. For those bills that the subscriber 102 desires that the BMS manage, the subscriber 102 will forward a copy of the BMS address to those merchants so that in the future, they will send the paper bills directly to the BMS address. The subscriber's BMS address will include other information, including preferably, the name of the subscriber and a corresponding BMS account number. The BMS 100 will use this information to identify each bill and for whom the bill is intended.

Alternatively, to assist the subscriber 102 to change the subscriber's home/business billing address to the BMS address, the BMS 100 will provide the subscriber 102 with a form for the subscriber 102 to sign, which will authorize the BMS 100 to change the address on behalf of the subscriber 102 for those bills that the subscriber 102 desires the BMS to manage. The BMS 100 will also send the subscriber 102 forwarding labels with the BMS address for the subscriber 102 to put on those bills they want the BMS 100 to manage. When the BMS 100 receives the bills with the forwarding labels, the BMS 100 will then prepare a letter on behalf of the subscriber 102 requesting that the merchant 104 change the address to the BMS address for billing purposes.

In some instances, bills may be received at the BMS 100 that contain information for a merchant 104 that has not been established for the subscriber. BMS will then create a new merchant database for the subscriber 102.

Figure 2:
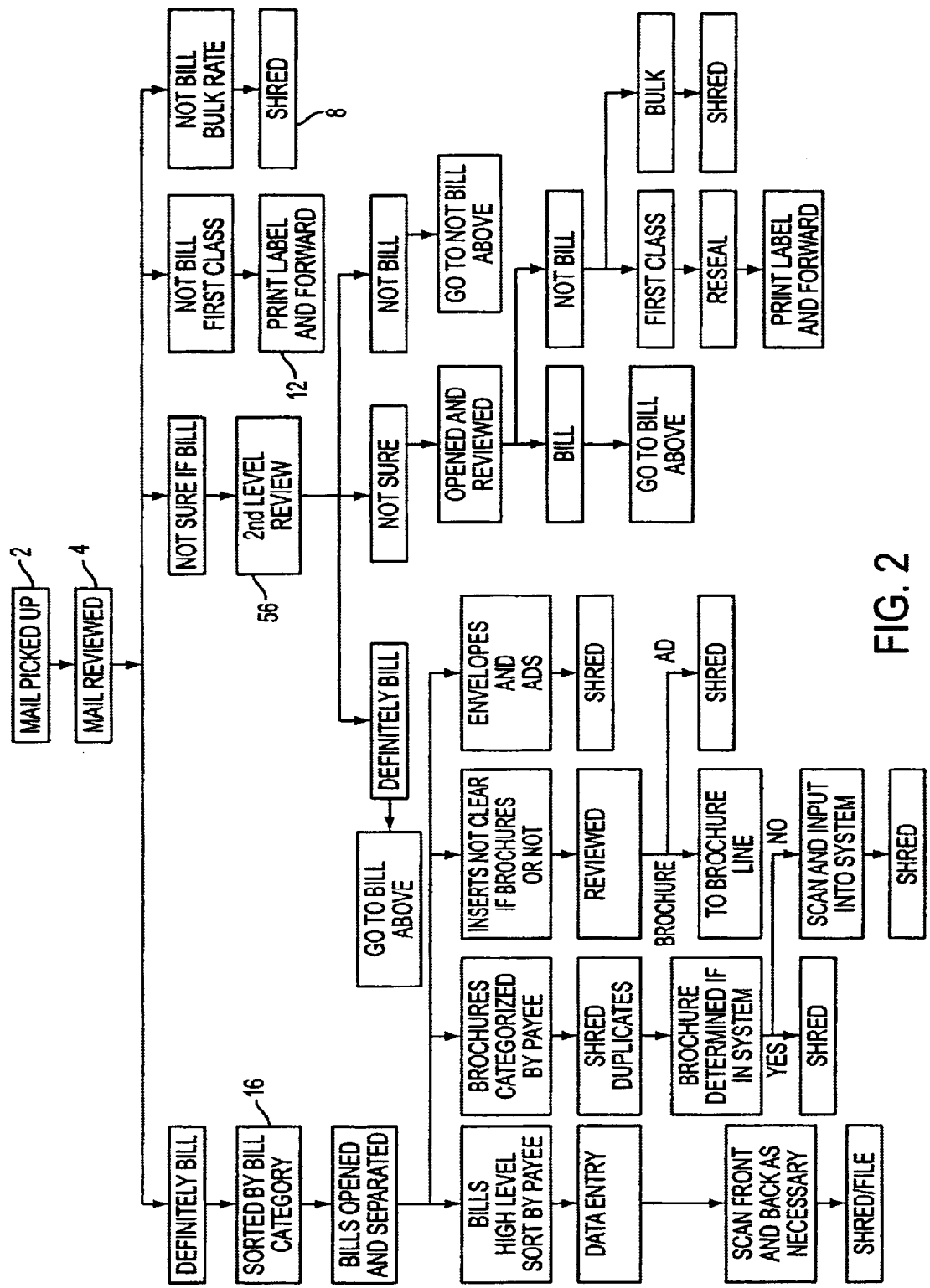
FIG. 2 illustrates an overview flow chart of a method for managing paper mail/bills in accordance with the preferred embodiment of the present invention.
Figure 3:
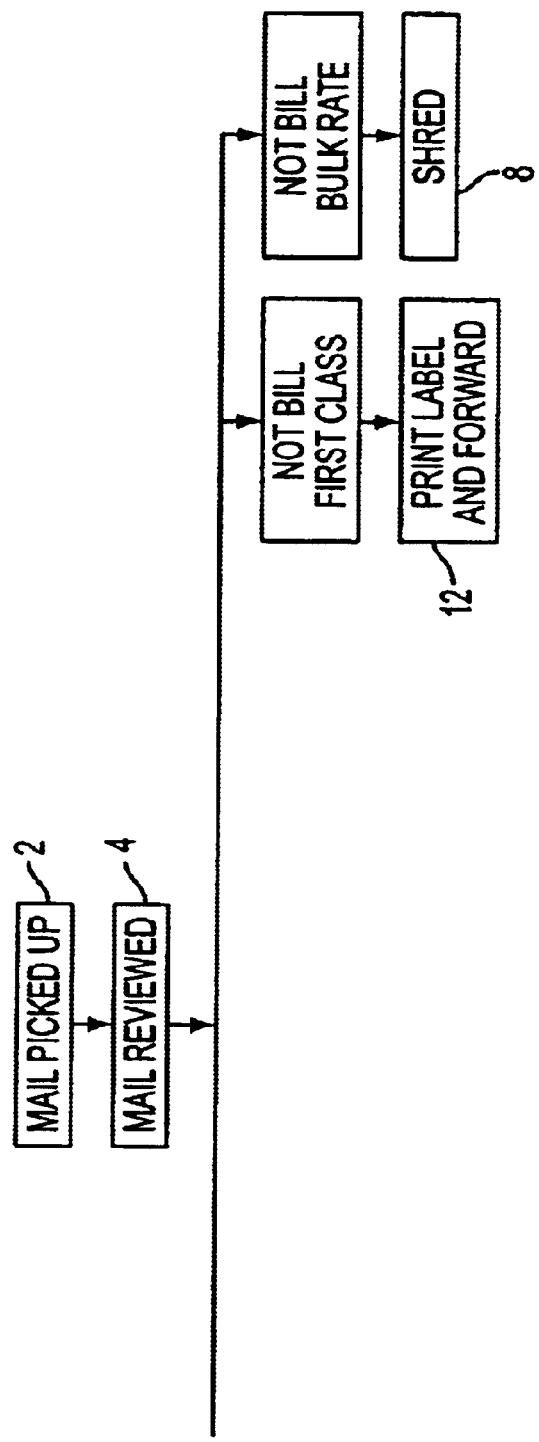
FIG. 3 illustrates a flow chart of a method for processing paper mail that are not bills in accordance with the preferred embodiment of the present invention.
Figure 4:
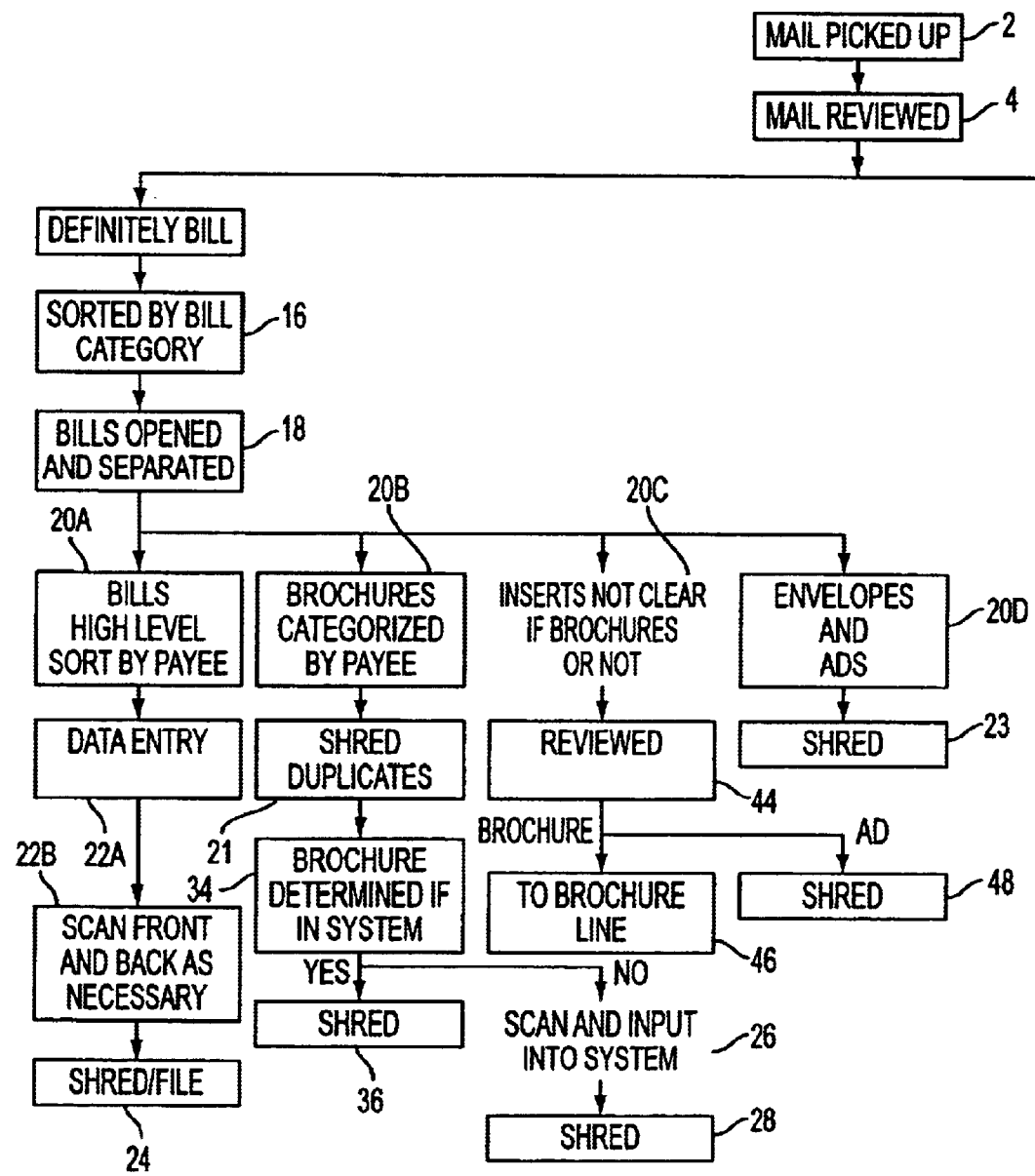
FIG. 4 illustrates a flow chart of a method for processing paper mail that are bills in accordance with the preferred embodiment of the present invention.
Figure 5:
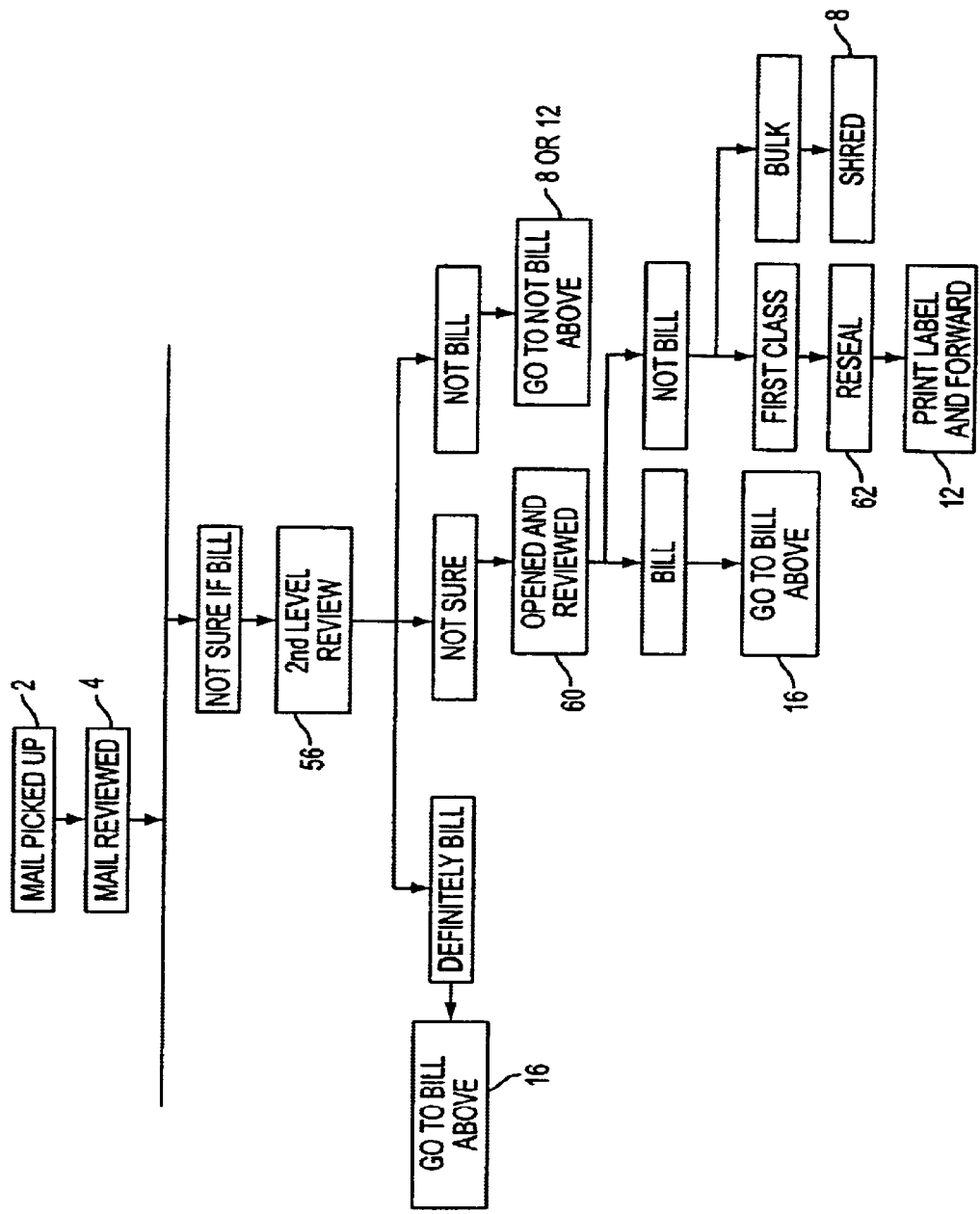
FIG. 5 illustrates a flow chart of a method for determining whether a particular mail is a bill in accordance with the preferred embodiment of the present invention.

FIGS. 2–5 illustrate flow charts of a method for managing/processing mail/bills in accordance with a preferred embodiment of the present invention. The present invention has the ability to sort, organize, and manage all mail in a central location. FIG. 2 illustrates an overview flow chart of a method for managing incoming paper mail according to the preferred embodiment of the present invention. FIGS. 3–5 illustrate flow charts identical to the flow chart of FIG. 2 of a method for managing incoming paper mail depending on their characteristics.

Mail received at the BMS will be managed and organized in its database by a person and/or an electronic data management device, i.e. computer, according to the following conditions. With reference to FIG. 2, when a particular mail is first received at the BMS in step 2, it is first reviewed and sorted by a person or computer in first reviewing step 4. The person or computer reviews the outside of the envelope without opening it. In most cases, the person or computer will be able to determine whether the particular mail is a bill or not after performing the first reviewing step 4. If, however, the person or computer is unable to determine whether the mail is a bill or not after performing the first reviewing step 4, then a second reviewing step 56 is performed, which is described in more detail later herein with reference to FIG. 5. A different person or computer will review the outside of the envelope in the second reviewing step 56.

In accordance with the present invention, mail received at the BMS can be generally categorized into four categories and forwarded to an appropriate step for further processing: (1) mail sent bulk rate that are not bills are forwarded to shredding step 8; (2) mail sent first class that are not bills are forwarded to labeling and forwarding step 12; (3) mail that are bills are forwarded to categorizing step 16; and (4) mail that cannot be determined whether they are bills after the first reviewing step 4 are forwarded to the second reviewing step 56. These categories and the subsequent steps are described in more detail below.

First, the person or computer will determine whether a particular mail is a bill or not in the first reviewing step 4 without opening the sealed envelope. With reference to FIG. 3, if the person or computer determines in first reviewing step 4 that the particular mail is definitely not a bill, the person or computer will next determine the type of mailing service, bulk rate or first class, used by the merchant in sending the mail. If the non-bill mail was sent via bulk rate, a shredding step 8 is performed to shred the mail using any conventional shredding device since most non-bill mail sent bulk rate is usually "junk mail," and subscribers are not likely to be interested in nor have the time to review such "junk mail." Furthermore, "junk mail" cannot be forwarded to subscribers by attaching labels with the subscribers' home/business addresses without incurring additional mailing costs.

Again referring to FIG. 3, if the particular non-bill mail was sent first class, the person or computer will print a label in a labeling and forwarding step 12 with the subscriber's home/business address. The label will then be attached to the non-bill mail so that it can be forwarded to the subscriber's home/business address since most non-bill mail sent first class may be of some importance to the subscriber. The labeling and forwarding step 12 allows the subscriber to review such mail and respond accordingly.

FIG. 4 illustrates a flow chart of the method for processing mail when a person or computer determines in first reviewing step 4 that a particular mail is definitely a bill. The bills are sorted and categorized by the person or computer into appropriate bill categories, i.e. utility, credit card, student loans, etc., in first sorting step 16. After performing the first sorting step 16, an opening and separating step 18 is performed where the envelopes will be opened by the person or an automatic envelope opener, and the contents contained therein are separated and processed.

The person or computer separates the various contents contained in the envelopes into the following categories in the second sorting steps 20A–20D: (1) actual bill statements, (2) brochures, (3) inserts, and (4) return envelopes and advertisements. The steps in the second sorting steps 20A–20D may be performed simultaneously.

Figure 6A:
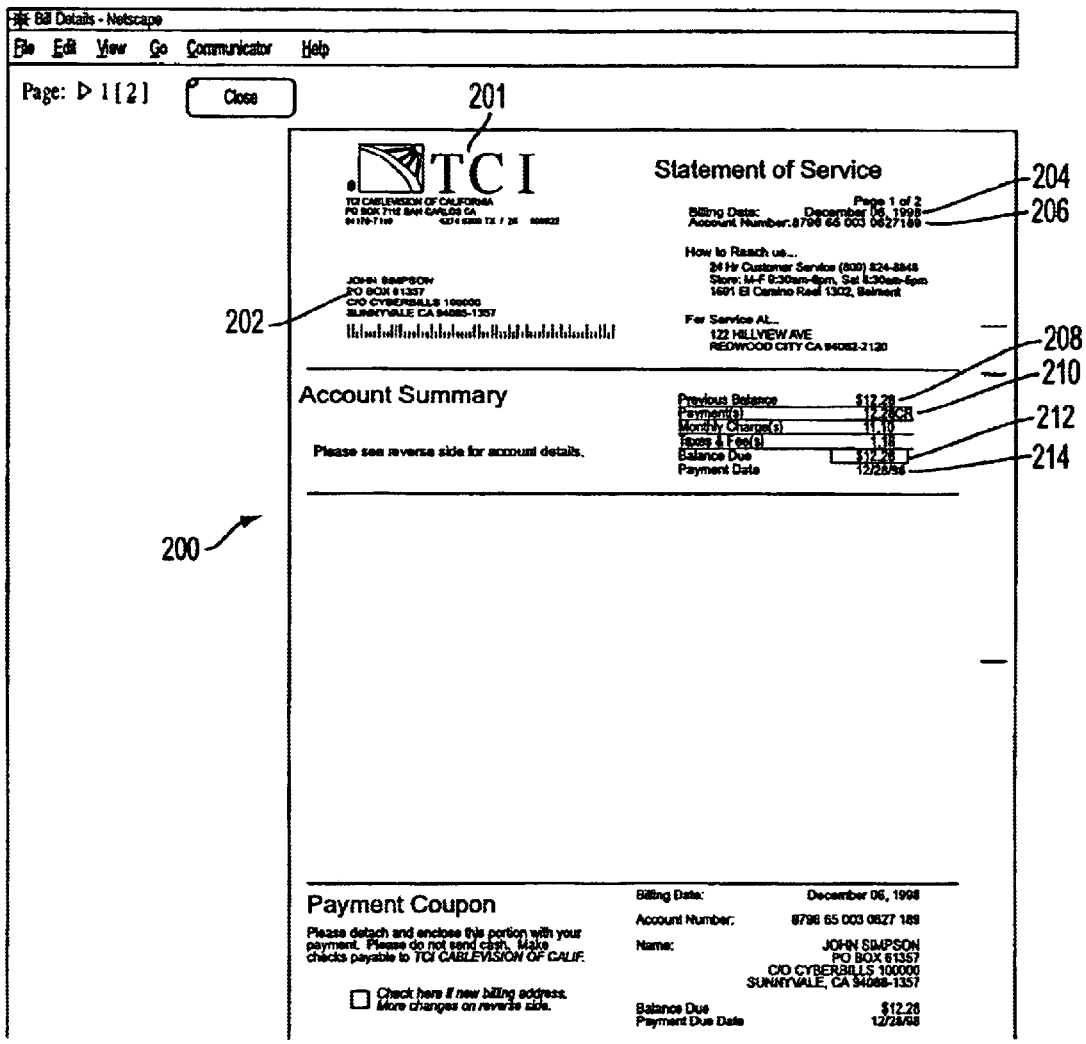
FIG. 6A illustrates an electronic bill/template formatted from data extracted from a paper bill in accordance with the preferred embodiment of the present invention.

First, the actual bill statements are sorted according to the particular merchant in second sorting step 20A, and data entry step 22A is performed by the person or computer so that the necessary data on each bill is stored in the database. In particular, paper bills received by the BMS are preferably scanned into the system by a person or computer in scanning step 22B in order to transfer the necessary data such as balance, amount due, current interest rate, charges in the last billing period and the like into electronic form. FIG. 6A illustrates a sample electronic bill formatted from the data obtained from the paper bill in accordance with the preferred embodiment of the present invention, and will be described in more detail later herein. Thereafter, the actual bill statements may be shredded or filed in shredding/filing step 24 in accordance with the subscriber's instructions.

Figure 7:
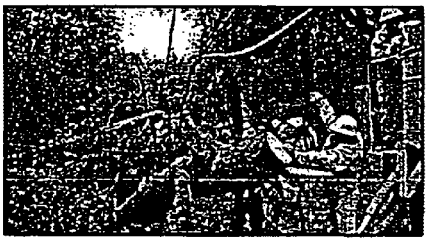
FIG. 7 illustrates a sample brochure in accordance with the preferred embodiment of the present invention.

Second, brochures or other documents, i.e. legal documents, accompanying the bills are separated and categorized by a person or computer according to the particular merchant in the second sorting step 20B. FIG. 7 illustrates an example of a sample brochure 240 in accordance with the present invention. Brochures are defined by the subscriber and dealt accordingly, i.e. a brochure may be any document that contain information other than in a form of product advertisements, in which case, the product advertisements in bill envelopes will be shredded. When the person or computer determines that duplicate brochures are present because identical brochures are included in one envelope or in two different envelopes, the duplicates are shredded in shredding step 21 using any conventional shredding device. If on the other hand, there are no duplicate brochures present, the person or computer next determines if the contents of the brochure, i.e. brochure 240, has been previously stored electronically in the BMS database in searching step 34. The person or computer will search the database for the contents of the brochure 240. If after performing searching step 34 it is determined that the contents of the brochure 240 have been previously stored in the database, the brochure 240 is shredded in shredding step 36. However, if the contents of the brochure 240 have not been previously stored in the database, then it is scanned and stored into the system in scanning step 26. Once stored in the BMS system, the brochure 240 is then shredded in shredding step 28.

In certain situations, a person or computer may not be able to determine whether a certain insert is a brochure in second sorting step 20C. In this case, the insert is manually reviewed by a BMS staff in insert reviewing step 44 and processed accordingly. For example, if in fact the insert is a brochure, the insert will be processed according to the steps described above beginning with step 20B. If, however, the insert is determined not to be a brochure and more likely an advertisement, the insert will be shredded in shredding step 48.

Finally, when the second sorting step 20D is performed, a person or computer will separate return envelopes and advertisements from the other contents accompanying the bills, and they will be shredded in shredding step 23. Because the BMS system provides electronic payment of bills, subscribers no longer need return envelopes.

FIG. 5 illustrates a flow chart of a method for determining whether the particular mail is a bill in accordance with the preferred embodiment of the present invention. The person or computer conducts a first level review of the mail in first reviewing step 4 by reviewing the outside of the envelope. As described earlier herein, in most cases, the first level review is sufficient for determining whether the mail is a bill or not. However, in certain occasions, the person or computer may be unsure after performing the first reviewing step 4. In this case, a second level review is performed in second reviewing step 56. In this step, a more sophisticated person or computer will review the outside of the envelope without opening it. If after performing the second reviewing step 56, it is determined that the particular mail is definitely a bill, then it is forwarded to categorizing step 16 as described earlier and illustrated in FIG. 4. If, on the other hand, it is determined that the particular mail is definitely not a bill, then it is forwarded to either steps 8 or 12 as illustrated in FIG. 3 depending on the type of mailing service used by the sender.

There can be situations when after performing the second reviewing step 56, the person or computer still cannot adequately determine whether the particular mail is a bill. In this case, a person manually opens the envelope and reviews the contents contained therein in the opening and reviewing step 60. After the opening and reviewing step 60, if the person determines that the mail is in fact a bill, it will be forwarded to categorizing step 16 as illustrated in FIG. 4. If, on the other hand, the mail is not a bill, it will be forwarded to either shredding step 8 or labeling and forwarding 12 depending on the type of mailing service used by the sender as illustrated in FIG. 3. It should be noted that if the mail was sent first class, a resealing step 62 is performed before the labeling and forwarding step 12 in order to reseal the envelope. This is because the envelope was opened at opening and reviewing step 60.

On many occasions, when a paper bill is received by the BMS, a template 200 as illustrated in FIG. 6A for the bill is created using an OCR/Scanning software, which is a conventional off the shelf software. The template 200 allows the BMS system to automatically identify a merchant and the physical locations on the bill where specific data can be found. For example, section 201 of the template 200 in FIG. 6A is used to identify the merchant, and section 202 is used to identify the subscriber's name, the BMS address, and the corresponding BMS account number. Section 204 indicates the billing date, and section 206 provides the subscriber's account number used by the merchant. Next, section 208 contains the previous balance, section 210 contains the payment(s) previously received by the merchant, section 212 contains the balance due, and section 214 contains the payment due date of the current bill.

A person may manually enter pertinent bill information (previous balance, current charges, payments, credits, finance/interest/late payment charges, current balance, past due amount, minimum payment due, billing date, and date payment due), or preferably, a scanner can be used to scan the bill, and this information will be stored in the BMS database and provide the necessary data to prepare the template 200. When the bill is scanned, the OCR/Scanning software will then begin analyzing the scanned images. The software compares the created template with the images of the original bill and determines the accuracy of the data. If the software can not be completely certain of the data extracted and its accuracy, the software will provide a message to a BMS staff so that the BMS staff can manually check the accuracy of the create template. Once the template is created, subsequent bills from the same merchant will only need to be scanned.

FIG. 6B illustrates a bill transmitted electronically to the BMS in accordance with the preferred embodiment of the present invention. The online BMS system allows a subscriber to have a bill transmitted electronically to the central location. Per the subscriber's instructions, if a merchant is able to provide the BMS with an electronic bill 230 as illustrated in FIG. 6B, the electronic bill 230 will be transmitted to the BMS through any electronic media the merchant desires. In some cases, the merchant will electronically transmit the complete bill, or it may choose to transmit only limited information, leaving a more detailed information on its own server. A person or computer will process the limited information, which is then stored in the BMS database. If the complete bill is transmitted, all bill information will likewise be processed and stored in the BMS database. If a more detailed information remains at the merchant's web site, then a link to the merchant's URL for the detailed information will be provided to the subscriber.

The process of notifying the subscriber that a bill has been received at the BMS location will now be described. Once a bill is received, an email will be generated and sent to the subscriber indicating that the bill was received along with pertinent bill information. This email will preferably contain a web site link for the subscriber to quickly and efficiently log on to the BMS system to view the bill information.

The BMS system has additional features and advantages that will be described in more detail. For example, when a payment is due within a number of days from the due date, and the payment has not been made, the BMS system can generate a reminder email to the subscriber with the merchant's name, the due date, and pertinent bill information. In another example, a bill may not have been received at the BMS location by an expected date. If the bill was expected by a certain date (this date can be determined by the BMS system using the normal billing date and cycle of the bill), but was not yet received at the BMS location, an email can be generated and sent to the subscriber providing the merchant's name and address and contact information so that the subscriber can contact the merchant directly to inquire about the delay. In other instances, when a payment has been made electronically, an email can be generated informing the subscriber of such payment. The subscriber can choose to turn on or off any of these services for any particular merchant.

Figures 8, 9:
FIG. 8 illustrates a first level summary report in accordance with the preferred embodiment of the present invention.
FIG. 9 illustrates a second level summary report in accordance with the preferred embodiment of the present invention.

FIG. 8 illustrates an online bill summary report 250 in accordance with the preferred embodiment of the present invention. Each subscriber has access to a number of important information at the BMS location. When the subscriber logs on to the BMS online location with the approved userid and password, the subscriber can view the report 250 that lists subscriber's merchants in payee box 252. Further, in the payee box 252, links will be provided to a second level report where the subscriber can view additional information about the current bill or past bills for that merchant. For each merchant, information regarding the most current bill received at the BMS location (whether it is paper or electronic), and other information will also be available. Preferably, the merchants are listed in the order of the most recent bills received as illustrated in a bill-received box 251. The bill date box 254 contains the billing date for each bill; the balance due box 256 contains the remaining balance for each merchant; and the due date box 258 contains the due date of the payment. Next, box 260 further includes information on whether the current bill has been paid for a particular merchant, and the remarks box 262 contains information regarding scanned bills as well as brochures and legal information. Remarks box 262 contain miscellaneous information regarding the merchant and/or the current/past bills.

In the payee box 252, when the subscriber clicks on any merchant link, the BMS system will link the subscriber to the second level report for the merchant. The second level report 270 as illustrated in FIG. 9 will include all information for the specific bill for the selected merchant, and will also have links to previous bills for the merchant. If the subscriber clicks on a previous bill in box 280, the subscriber will see the second level report again with the same information contents as it applies to the previous bill. From the second level report 270, the subscriber can choose to see the details of the actual bill by choosing icons in box 290. For example, if the bill was originally a paper bill, the subscriber can click on an icon 292 and will be presented with a web page with an image of the scanned bill. If the bill details were supplied electronically, the subscriber can click on a different icon 294 in box 290 and will be presented with the bill details. If the bill details are electronic yet stored on the merchant's web site, the subscriber can click on the merchant's link (not shown) in box 290 and be transferred to the merchant's web site where the subscriber can view the bill details.

Next, the process of making payments in accordance with the preferred embodiment of the present invention will now be described. A subscriber using the BMS system can authorize any payment to be made to any merchant at any designated time and date. In addition, the subscriber can establish recurring payments when bills are paid on a regular basis (monthly, weekly, daily, etc.), and/or have a predetermined amount paid for each pay period. The subscriber can also establish automated payments for each merchant since the BMS database will have information pertaining to each bill. These payments can be designated to be paid upon receipt or within a specified time from the payment due date. In addition, the subscriber can have the BMS system determine the amount to be paid based on rules the subscriber establishes for each merchant. For example, the subscriber can instruct the BMS system to pay a full amount, a minimum amount, or an amount as determined by a conditional statement (i.e., if the bill is less than five hundred dollars, then pay the full amount, otherwise, pay the minimum amount). What is important to note from this example is that the subscriber can instruct the BMS to pay the merchants in accordance with any conditional statement that the subscriber desires.

In addition to the services described above, the BMS system allows the subscriber to make payments from multiple institutions and various accounts for greater flexibility and efficiency.

Figure 10:
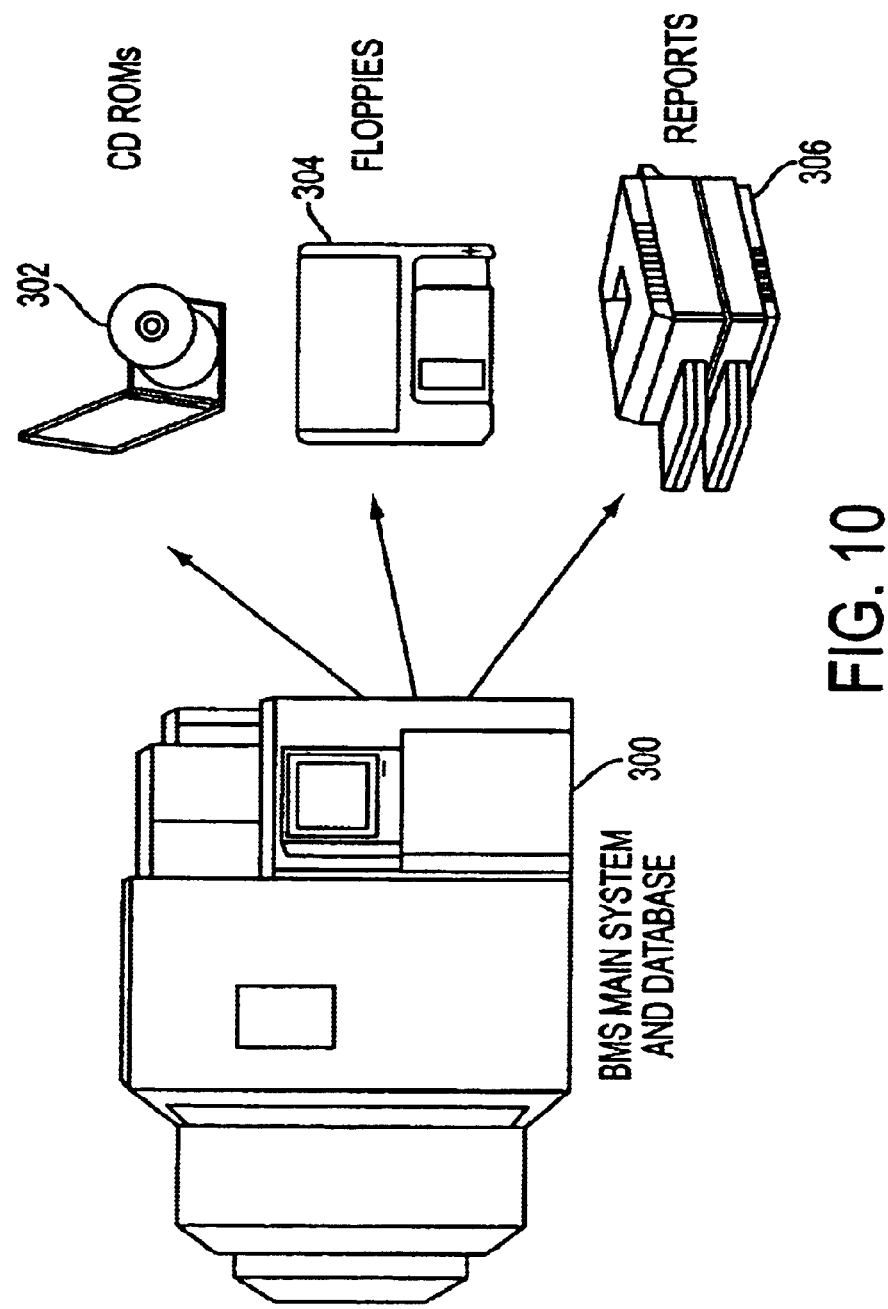
FIG. 10 illustrates a main system and database for generating CD ROMs, floppy disks, and/or reports in accordance with the preferred embodiment of the present invention.

Also, at the end of every quarter, or calendar or fiscal year, a person or computer at the BMS location can prepare reports, charts, tables, graphs, or the like of the subscriber's activities for a given period on a CD ROM, floppy disk, or any other recordable medium. FIG. 10 illustrates a BMS main system and database 300 that is used to generate a CD ROM 302, Floppy Disk 304, and/or reports from the printer 306. This stored information can save the subscriber time and money when preparing yearly tax reports, loss/profit reports, or other financial documents.

Although various preferred embodiments of the present invention have been disclosed for illustrative purposes, those skilled in the art will appreciate that various modifications, additions and/or substitutions are possible without departing from the scope and spirit of the present invention as disclosed in the claims.

I claim:

1. A method for allowing a plurality of subscribers to each manage mail stored in electronic form at a data storage location from remote locations, the method comprising the steps of:

receiving mail for the subscribers in paper and electronic format, wherein certain pieces of mail are bills in paper format and certain other pieces of mail are bills in electronic format;

sorting the received mail in paper format, wherein bills in paper format are saved and certain other mail in paper format is discarded;

storing data into a database at the data storage location, wherein the data is obtained from bills in paper format and bills in electronic format, the storing data step further includes determining if a template exists for a bill in paper format, and, if the template exists, scanning the paper bill to enter specific data contained in the paper bill into the database, and if a template does not exist and the bill in paper format has not been previously provided, creating a template to allow specific data contained on the paper bill in specific locations to be automatically identified before the bill is scanned into the database using the newly created template;

generating an electronic bill statement for each of the plurality of subscribers, each electronic bill statement including a first summary report that summarizes all bills for each subscriber based on the stored data corresponding to that subscriber; and providing access to the electronic bill statement and the first summary report to each subscriber at a remote location.

2. A method according to claim 1, wherein the receiving step further comprises the step of transmitting the bills in electronic format to the data storage location over one of a public internet and a private network.

3. A method according to claim 1, wherein the sorting step further comprises the step of discarding unneeded information that is contained in the received bills in paper format.

4. A method according to claim 1, wherein the first summary report uses a same first format for each bill summary.

5. A method according to claim 4, wherein the first summary report includes information regarding each of the bills for that subscriber, whether received in paper or electronic format, and wherein the information includes at least a merchant name, payment due date, payment received date, payment amount, balance, and status of payment.

6. A method according to claim 1, wherein the first summary report includes information regarding each of the bills for that subscriber, whether received in paper or electronic format, and wherein the information includes at least a merchant name, payment due date, payment received date, payment amount, balance, and status of payment.

7. A method according to claim 1, wherein the generating step further comprises the step of generating a second summary report.

8. A method according to claim 7, wherein the second summary report uses a same second format for each bill summary.

9. A method according to claim 1, wherein the electronic statement is assessed by each subscriber via one of a computer, a personal digital assistant ("PDA"), and an Internet TV device.

10. A method according to claim 1, wherein the electronic bill is accessed by each subscriber via one of a public Internet and a private network.

11. A method according to claim 7, herein the second summary report includes more detailed information regarding each of the bills than in the first summary report, and wherein the more detailed information includes at least a link to a merchant web page.

12. A method for allowing a plurality of subscribers to manage mail stored in electronic form at a data storage location from remote locations, the method comprising the steps of:

receiving mail for the subscribers in paper and electronic format, wherein certain pieces of mail are bills in paper format and certain other pieces of mail are bills in electronic format;

sorting received mail according to predetermined rules, wherein certain mail are saved and other mail are discarded, the predetermined rules comprising:
- (a) performing a shredding step when paper mail received at a mail receipt location are not bills and were sent bulk mail;
- (b) performing a labeling and forwarding step when paper mail received at the mail receipt location are not bills and were sent first class; and
- (c) performing a storing step when received paper mail are bills, the storing step comprising the step of storing data obtained from the bills electronically into a database by initially determining if a template exists for a bill in paper format, and if a template exists, scanning the paper bill to enter specific data contained in the paper bill into the database, and if the template does not exist and the bill in paper format has not been previously provided, creating a template for the bill to allow specific data contained on the paper bill in specific locations to be automatically identified and scanning the bill to enter specific data contained in the paper bill into the database using the newly created template; and providing access to the stored data to each of the subscribers at a remote location.

13. A method according to claim 12, wherein the predetermined rules further comprise performing a first reviewing step on paper mail without opening the mail envelope to determine whether the paper mail is a bill.

14. A method according to claim 13, wherein the predetermined rules further comprise performing a second reviewing step on paper mail without opening the mail envelope to determine whether the paper mail is a bill if it cannot be determined that the paper mail is a bill in the first reviewing step.

15. A method according to claim 14, wherein the first reviewing step is performed using a computer-based system and the second reviewing step is performed using a human operator.

16. A method according to claim 12, wherein the data storage location and the mail receipt location are centrally located near each other.

17. A method according to claim 12 further comprising the step of generating an electronic bill statement for each subscriber, the electronic bill statement including a first summary report that summarizes all bills based on the stored data.

18. A method according to claim 17, wherein the first summary report uses a same first format for each bill summary.

19. A method according to claim 17, wherein the first summary report includes information regarding each of the bills for that subscriber, whether received in paper or electronic format, and wherein the information includes at least a merchant name, payment due date, payment received date, payment amount, balance, and status of payment.

20. A method according to claim 17, wherein the generating step further comprises the step of generating a second summary report.

21. A method according to claim 20, wherein the second summary report uses a same second format for each bill summary.

22. A method according to claim 17, wherein the electronic bill statement is accessed by each subscriber via one of a computer, a personal digital assistant ("PDA"), and an Internet TV device.

23. A method according to claim 17, wherein the electronic bill statement is accessed by each subscriber via one of a public Internet and a private network.

24. A method according to claim 20, wherein the second summary report includes more detailed information regarding each of the bills than in the first summary report, and wherein the more detailed information includes at least a link to a merchant web page.

25. A system for electronically transmitting bill information to a plurality of subscribers and receiving requests from the subscribers at a remote location, the system comprising:
- a location adapted to receive paper bills;
- a computer system for generating an electronic bill statement, the computer system including:
  - a database for electronically storing data associated with the bills for each subscriber;
  - a template analysis system which determines whether a template exists for each paper bill to allow specific data contained on the paper bill in specific locations to be automatically identified, the template analysis system creating a template if a template does not exist and a paper bill has not been previously supplied, the template analysis system then entering data from each paper bill into the database by scanning each paper bill and transforming the data on each paper bill into electronic form which is then entered into the database; and
- a bill generation system which generates an electronic bill statement from the data stored in the database for each subscriber, the bill generation system generating a first summary report and a second summary report for each subscriber, the first summary report including at least a merchant name, payment due date, payment received date, payment amount, balance, and status of payment for each bill, and the second summary report including at least a link to a merchant web page; and
- an endstation coupled to the database and adapted to receive the electronic bill statement including the first summary report that summarizes all bills based on the stored data, whereby in response to subscriber input, the endstation transmits requests from the subscriber at the remote location to the data storage location.

* * * * *